United States Patent [19]
Lowell et al.
[11] Patent Number: 4,782,428
[45] Date of Patent: Nov. 1, 1988

[54] COLLAPSIBLE FLUORESCENT LIGHT FOR PHOTOGRAPHY

[76] Inventors: Ross Lowell, c/o Lowel-Light, 475 Tenth Ave., New York, N.Y. 10018; Edward Calamai, 9 Oneida Rd., Pleasantville, N.Y. 10570; Stephen Doll, 4 W. 103 St. - #5C, New York, N.Y. 10025; Dale Marks, 425 Benignus, Houston, Tex. 77024; Apiruk Pronputhsri, 46-16 44 St., #4G, Sunnyside, N.Y. 11104; Marvin Seligman, 700 Carroll Pl., Teaneck, N.Y. 07666

[21] Appl. No.: 88,049
[22] Filed: Aug. 21, 1987
[51] Int. Cl.⁴ ...................... G03B 15/02; F21V 21/24; F21S 3/12
[52] U.S. Cl. .......................................... 362/11; 362/3; 362/18; 362/225; 362/401; 362/429; 248/292.1
[58] Field of Search ....................... 362/3, 11, 18, 225, 362/319, 346, 401, 429; 248/292.1, 364

[56] References Cited

U.S. PATENT DOCUMENTS 2,352,496 6/1944 Rose ............................... 362/225 X
2,476,352 7/1949 Bissell et al. .................... 362/225 X
2,827,553 3/1958 Riches .................................. 362/18
3,852,582 12/1974 Lowell ............................ 362/18 X

FOREIGN PATENT DOCUMENTS 70549 12/1958 France ............................. 248/292.1
525009 4/1955 Italy .................................... 362/225

*Primary Examiner*—Samuel Scott
*Assistant Examiner*—Allen J. Flanigan
*Attorney, Agent, or Firm*—McGlew and Tuttle

[57] ABSTRACT

A collapsible fluorescent tube fixture comprises a frame having a pair of spaced apart tube end supports each carrying a row of sockets, each socket being for receiving electrodes of one end of a fluorescent tube, and a scissors assembly connected between the supports for permitting the supports to move together into a storage position and to accommodate various length tubes and apart into a use position. Fluorescent tubes can be engaged between the sockets of the two supports with the supports in their use position. A boom has one end connected to the scissors assembly and an opposite end which carries an electrical ballast. The ballast is electrically connected to the sockets and may serve not only to electrically ballast the fluorescent tube but also to mechanically balance the weight of the frame. A pivot clamp connected intermediate the ends of the boom can be used to mount the boom on a tripod or other support structure.

20 Claims, 4 Drawing Sheets

COLLAPSIBLE FLUORESCENT LIGHT FOR PHOTOGRAPHY

FIELD AND BACKGROUND OF THE INVENTION

The present invention relates in general to lighting for photography including still, cine and video photography.

When shooting stills, movies or videos in an area lit with fluorescent light, such as supermarkets, showrooms, schools and offices, it is often difficult to balance downwardly shining or other fluorescent light. If this light is not balanced, photographs result with subjects having overly dark eyes and the lighting is generally listless.

In the past one solution to this problem was to turn off all the fluorescent lights. This often is impractical or too time consuming to relight large areas.

Another technique is to provide additional fluorescent fixtures having the same color temperature as the ceiling fixtures, and shining the light from these additional fixtures from approximately eye level toward the subjects. Fluorescent fixtures however, are notoriously bulky and heavy. Generally the equipment must be trucked in, significantly adding to the cost.

One known fluorescent fixture sold by the Softube Company of New York, has a frame for carrying four fluorescent tubes. The frame is made of two rigid parts which, with the tubes removed, can be folded in half. The sides and configuration of the folded package however, is still quite bulky and little savings in weight is achieved. Additionally, only a single length fluorescent tube can be accommodated in the fixture.

SUMMARY OF THE INVENTION

The present invention seeks to solve the problem of providing balanced fluorescent light at an on-site location.

The fluorescent light fixture of the present invention is collapsible into a compact configuration that can easily be accommodated in a suitcase that can be carried by a single individual. The collapsibility of the fluorescent fixture permits the use of 'loaner' tubes from the facility at which the photographic session is to take place. Standard four foot tubes can be used. A supply of these tubes are generally available from the maintenance department of any site using fluorescent lighting, or are readily accessible.

The fluorescent fixture of the present invention can thus be used to balance the ceiling lights, both for contrast control and color. A color balance is achieved since the fluorescent tubes used in the fixture of the present invention can be the same as those used on site. This achieves a perfect color balance. Although fluorescent tubes are best suited to the present invention, elongated high output lamps can also be used.

The design of the present invention also separates the relatively heavy ballast, whether a magnetic or an electronic ballast is used, from the rest of the fixture, through a balancing beam. The beam can be mounted on a tripod or other secure support near the middle of this beam. A physical balance is thus achieved that makes the fixture easy to manipulate and aim.

The frame elements of the fixture can also be removed from the ballast elements for hanging them separately. They can be mounted on chairs, rails or from ceiling joists. This makes the fluorescent fixture of the present invention extremely versatile and convenient. This also makes it practical to hold the fixture when time or other problems make it necessary.

Another advantage of the invention is that the frame for carrying fluorescent tubes is collapsible to accommodate different lengths of the tubes. A single unit can thus accommodate two foot, three foot and four foot fluorescent tubes The fluorescent fixture of the present invention is also provided with pivotally mounted barn doors and a rear reflector made of a flexible fabric or sheet material. The reflector also has panels which are pivorable to better control 'spill' light or eliminate glare in the lens. Clips are provided on the barn doors so that gels or filters can be stretched across the front of the light fixture to further diffuse the lighting, change its intensity or change its color.

Accordingly, an object of the present invention is to provide a collapsible fluorescent or high output light fixture which is collapsible and which, when extended, can accommodate fluorescent tubes of various sizes and types in a balanced and easily manipulatable manner.

A further object of the invention is to provide a fluorescent fixture for use in photography which is simple in design, rugged in construction, and economical to manufacture. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENTS

Figure 1:
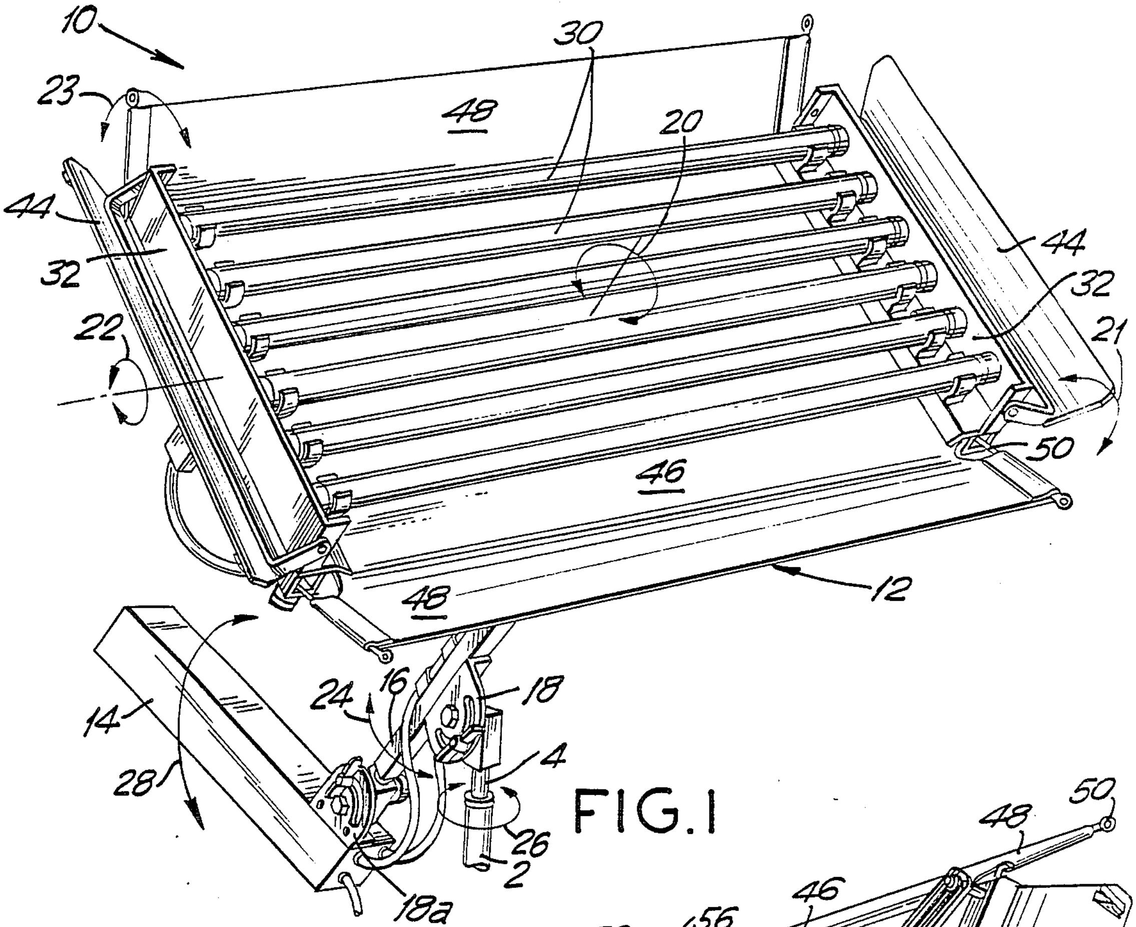
FIG. 1 is a front perspective view of the fluorescent light fixture of the present invention showing the various articulation points for aiming and controlling light emanating from the fixture.
Figure 2:
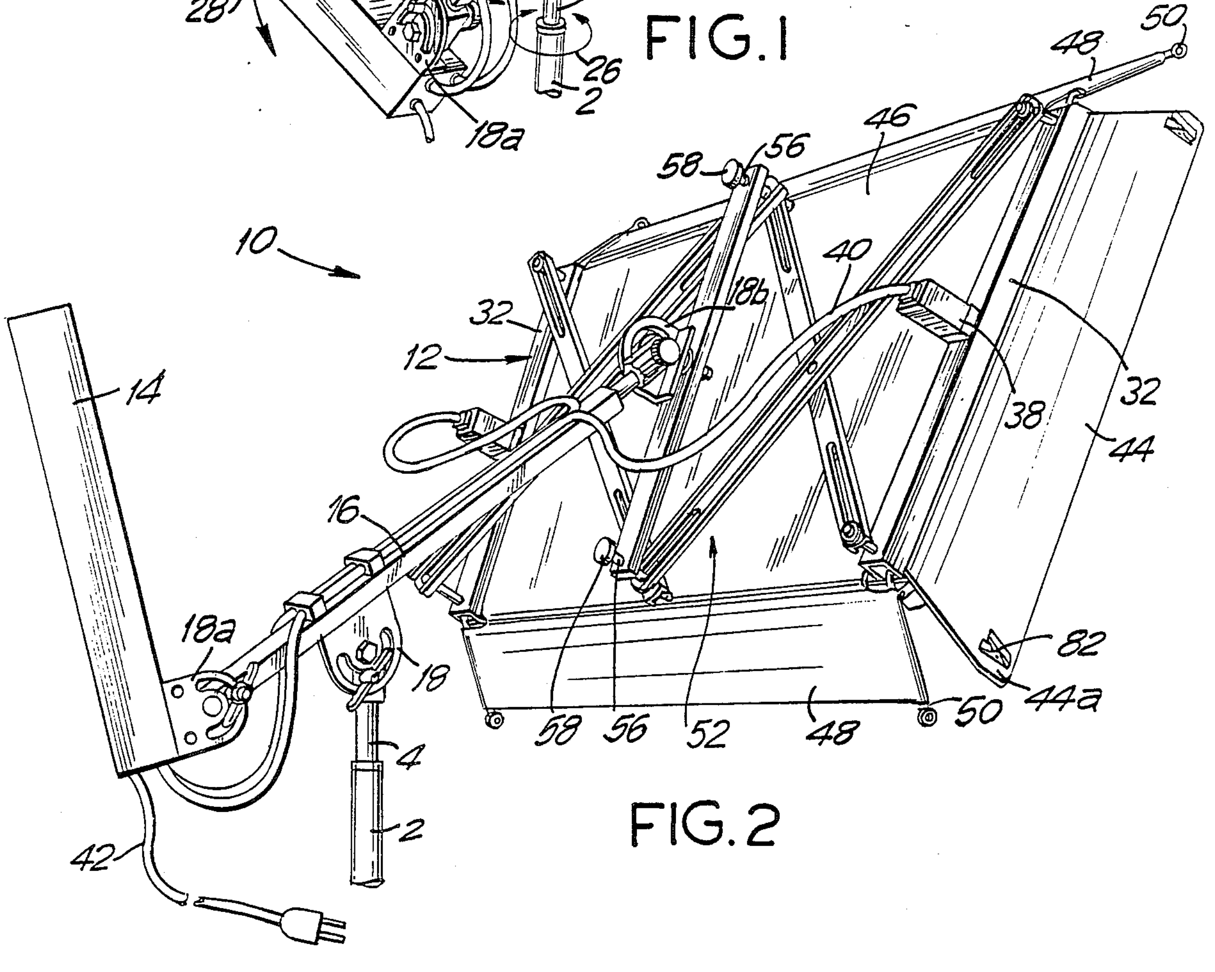
FIG. 2 is a rear perspective view of the fixture of FIG. 1.

Referring to the drawings in particular, the invention embodied in FIGS. 1 and 2 comprises a collapsible fluorescent fixture generally designated 10 having a fluorescent tube frame generally designated 12 and a ballast 14 which are interconnected by a beam or boom 16. The frame 12 and the ballast 14 are mounted at opposite ends of beam 16 so that their weights are balanced. The ballast may thus not only be used in the electrical sense but also physically as a counter balance. It is also understood that the invention may be embodied with other ballasts which are not of such a size as to act as a counter balance, without departing from the principles stated herein. A pivot clamp 18 is connected near the middle of beam 16 and can be clamped to the top post 4 of a tripod 2, only part of which is illustrated. The post 4 is a standard ⅜ inch stud, for example.

Ballast 14 is connected to the end of beam or boom 16, by a pivot clamp 18*a* which is substantially the same as clamp 18. A further pivot clamp 18*b* pivotally connects the opposite end of beam 16 to the frame 12. Each end of beam 16 is provided with a post which is similar to post 4 of tripod 2 so that the pivot clamps 18*a* and 18*b* can be connected to the opposite ends of the beam.

As will be explained in greater detail later, the pivot clamps 18, 18*a*, and 18*b*, permit various degrees of pivotal freedom between the two elements connected to each pivot clamp.

As shown in FIG. 1, this permits frame 12 to be rotated in the direction of arrow 20, about an axis which is normal to the broad face of the frame. The frame can also be pivoted in the direction of arrow 22 about an axis lying in the plane of the frame and extending substantially parallel to the direction of fluorescent tubes 30 which are held in the frame.

Beam 16 can pivot in the direction of arrow 24 on the tripod 2. The fixture 10 as a whole can rotate in the direction of arrow 26 on post 4. Ballast 14 can pivot in the direction of arrow 28 on beam 16.

In this way, the broad face ofthe fixture frame 12 can be directed for shining light in almost any direction. Its weight is balanced by pivoting ballast 14 into a counter balancing position.

Figure 3:
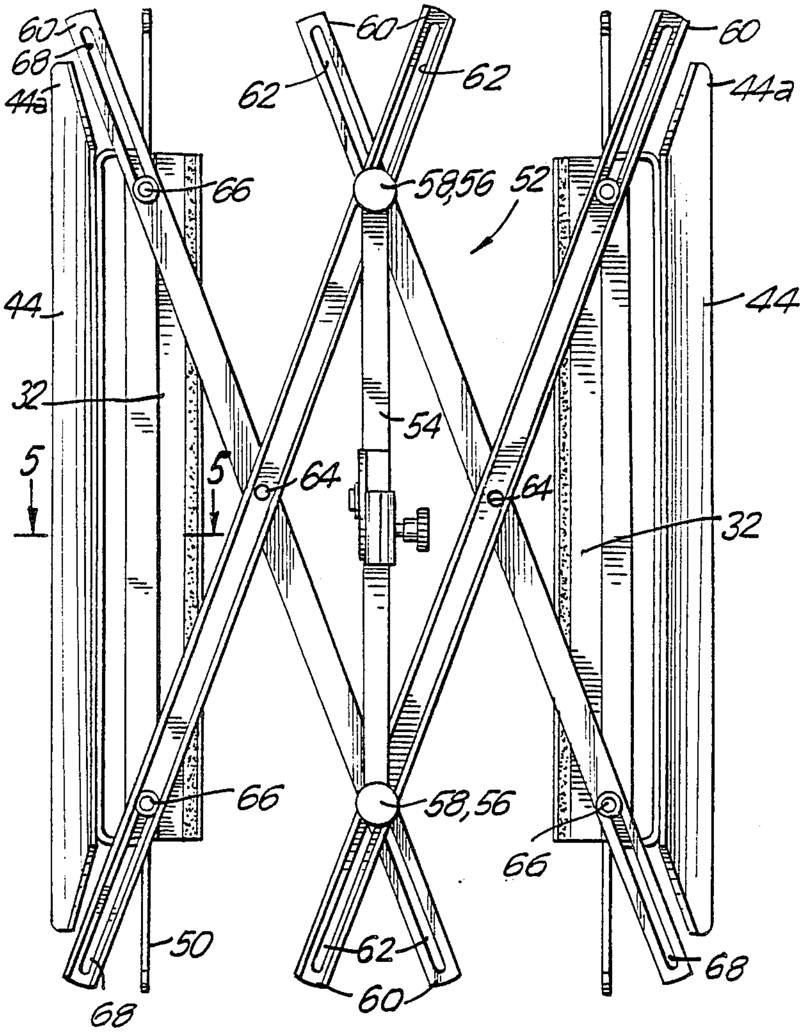
FIG. 3 is a rear elevational view showing the fixture with its reflector removed and in a partially collapsed condition.
Figure 4:
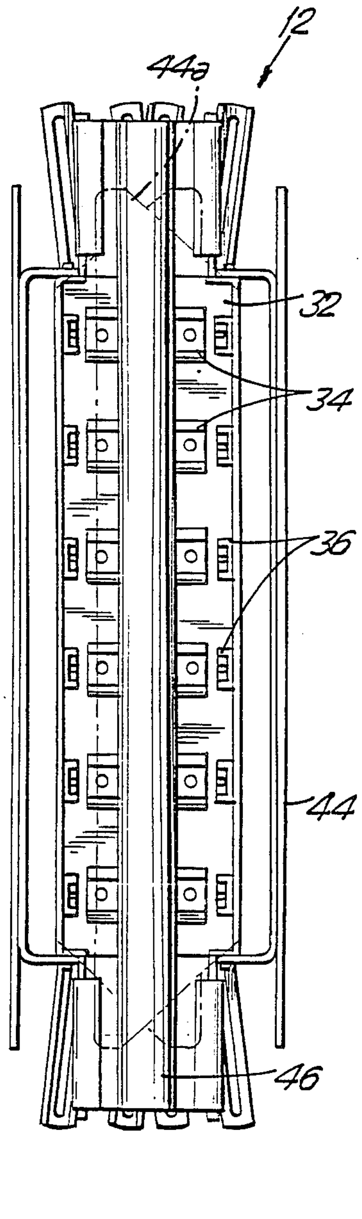
FIG. 4 is a front elevational view of the fixture in its fully collapsed position and with the reflector rolled and stored between holding clips for the fluorescent tubes.

As shown in FIGS. 2 and 3, frame 12 comprises a pair of spaced apart elongated tube end supports 32 which are identical mirror images of each other. As best shown in FIG. 4, each tube end support 32 carries a row of tube holding clips 34. Since six tubes are to be accommodated in the embodiment shown, six holding clips 34 are provided on each support 32. Each support 32 also carries six sockets 36 which contain electrodes for engagement with the electrodes on each end of a standard fluorescent tube. Clips 34 are aligned with their respective sockets 36 so that the opposite ends of each tube 30 shown in FIG. 1 is held by a pair of clips 34 on the pair of supports 32, with their electrodes being electrically engaged with a pair of sockets 36.

Plugs 38 and wires 40 electrically connect the sockets 36 to the ballast 14. Ballast 14 carries a power cord 42 which is provided with a dual line cord switch housing and plug for supplying electrical power to the fixture. A double switch arrangement allows three or six tube operations and may be switchable or dimmable. A single switch may also be used. Wire 40 extends along beam 16, and, for convenience can either be wrapped around the beam or secured to the beam with tape or by clips.

So-called barn doors 44 are pivotally connected to frames 32 for movement in the direction of arrow 21 to restrict or aim the light emanating from frame 12.

A flexible reflector 46 is connected to and extends between the supports 32. The reflector has a rear non-reflective surface which advantageously is black and opaque and a front reflective surface which is white or silver, for example.

Reflector 46 includes a pair of end flaps 48 which are carried on bail wires 50. Bail wires 50 are pivotally mounted to opposite ends of supports 32 so that the flaps 48 can be pivoted in the direction of arrow 23, again to aid in directing the light.

While the extension direction of bails 50 lie in a plane containing the longitudinal axis of support 32, the outer edges 44*a* of barn doors 44 are triangular and diverge outwardly from their respective supports 32. This facilitates the formation of a closed truncated pyramid shape between flaps 48 and barn doors 44 to more fully confine the light near the corners of frame 12.

Supports 32 are interconnected to each other by a collapsible scissor assembly generally designated 52. Scissor assembly 52 forms collapsing means for permitting the movement together and movement apart of the supports 32.

Assembly 52 comprises a central square cross-section tube 54 having opposite threaded posts 56 which each carry a knob 58. The posts extends through slots 62 of elongated scissor members 60. Pairs of scissor members 60 on opposite sides of central rod 54 are pivotally connected to each other at a pivot point 64. Each of the scissor members 60 has a slot 68 at its end remote from rod 54. A pivot pin 66 extends from the back of each support 32 and at each end of each support 32. Each pivot pin 66 is accommodated in one of the slots 68.

Scissor members 60 can slide along threaded posts 56 and pivot pins 66 to permit collapsing and extending of the supports 32. When the supports are brought to their desired folded or extended positions, knobs 58 can be rotated to tighten the scissor member 60 against the rod 54. To this end, each threaded post 56 can be provided with an outer washer which presses against the outer or front surface of scissor members 60.

The scissor members 60 also pivot about their pivot points 64 for extending and collapsing these supports 32.

FIGS. 1 and 2 show a fully extended position for supports 32 while FIG. 3 shows a partially collapsed position therefor. FIG. 4 shows a fully collapsed position. It is noted that in fully collapsed position, the flexible reflector 46 can be brought to the front of the unit between supports 32. It can then be rolled up into the configuration shown in FIG. 4 and conviently wedged between clips 34 lying in two lines on opposite sides of the now rolled reflector 46. The barn doors 44 can then be pivoted into a phantom line position shown in FIG. 4 with the ends 44*a* overlapping each other and fully covering the reflector. This produces an extremely compact and protective package for the frame.

Figure 8:
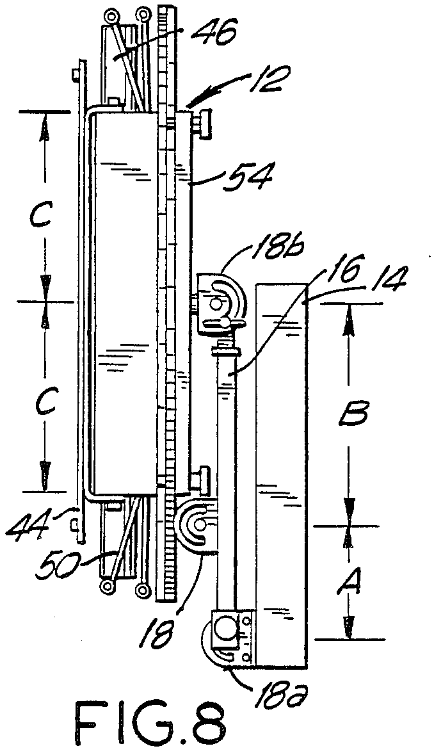
FIG. 8 is a side elevational view of the fixture shown in FIG. 1, in its completely collapsed and storage configuration.

FIG. 8 shows the collpased frame 12 with the beam or boom 16 and the ballast 14 all pivoted into their storage position. To improve the storage characteristic and balance of the unit, it has been found advantageous to position the pivot clamp 18*b* near the middle of central rod 54 so that the distance between this clamp and each end of the rod, shown at dimension C, is equal . The length of beam 16 is chosen to be about the same as the length of ballast 14. The pivot clamp 18, for connecting beam 16 to a tripod, is spaced by dimension B from clamp 18*b* which is greater than its spacing from clamp 18*a*, that is, dimension A.

Clamp 18 in its folded position should also come just under a lower end of central rod 54 so that beam 16 can be folded parallel to central rod 54. Dimension B is thus selected to be slightly longer than dimension C.

FIG. 8 also shows the barn doors 44 in their position covering the rolled up reflector 46.

Figure 5:
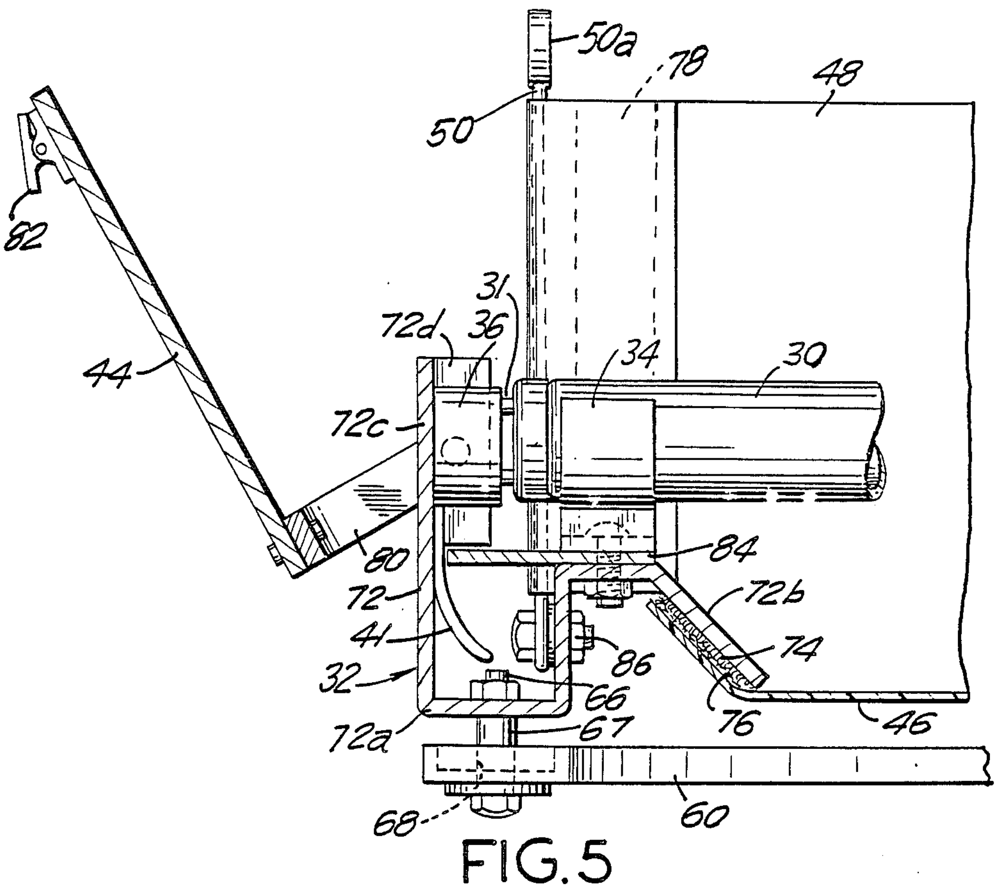
FIG. 5 is an enlarged sectional view taken along line 5—5 of FIG. 3.

Turning now to FIG. 5, details of the tube end support 32 are shown. Suport 32 comprises a bent sheet metal channel 72 having a U-shaped portion 72*a* and an open V-shaped portion 72*b*. The rear side of one leg of V-shaped portion 72*b* carries a fastener tape 74 which can be fastened to a tape 76 fixed near the lateral edge and on the front surface of reflector 46. Tapes 74 and 76 may be of a conventional hook and pile variety. Reflector 46 can thus be tautly stretched between supports 32.

Each end of flap 48 also includes an extension portion having a pair of spaced apart connecting tapes 78 which can be used for wrapping the bail 50 and securing ends of the flap 48 to the bails at opposite ends of the frame. Each bail 50 is provided with a large diameter end portion 50*a* to retain the ends of flaps 48 in the bails 50. FIG. 5 also shows one of the pivot ends 66 which extends into slot 68 of scissor member 60. A spacer 67 can be provided between channel 72 and member 60 to provide correct spacing between these elements. It is noted that since elements 60 must overlap each other to produce the scissor's effect, this spacing is necessary to prevent binding of the scissor members as they are extended and collapsed.

One of the clips 34 and one of the sockets 36 are also shown. They can be connected to channel 72 by any suitable means, for example, nut and bolt combinations, by screws or even by bonding.

Sockets 36 are carried on a leg portion 72*c* of the channel 72. The ends of long leg portions 72 have bends 72*d*. A U-shaped bracket 80 is pivotally connected to the bends 72*d* and carries the barn door 44. U-shaped bracket 80 can be connected to the barn door 44 by rivets or the like. FIG. 5 also shows the presence of a spring loaded gel clip 82 having one leg fixed to the back surface of barn door 44 and another leg which is articulated to the first leg. This is a conventional clip which can be used to hold the edges of a gel which can then be stretched across the front of the fluorescent tube frame 12.

A plastic cover plate 84 is connected between channel 72 and clip 34. It extends over the open mouth of the U-shaped portion 72*a*. Slots can be provided near the edge of plate 84 for accommodating a wire 41 that connects the socket 36 to the plug 38 (FIG. 2). A wire 41 connects each of the sockets to the plug. These wires are re;ained within the U-shaped portion 72*a* and are covered by the plate 84 for aesthetic and safety reasons.

Bail 50 is also shown connected to the short leg of U-shaped portion 72 at a pivot connection 86. For this purpose the inner end of bail 50 can simply be bent into a C-shape and then confined between a nut and bolt forming pivot connection 86.

FIG. 5 also shows how clip 34, which is C-shaped in cross-section embraces one end of a fluorescent tube 30 which tube includes electrodes 31 that extend into socket 36.

Figure 6:
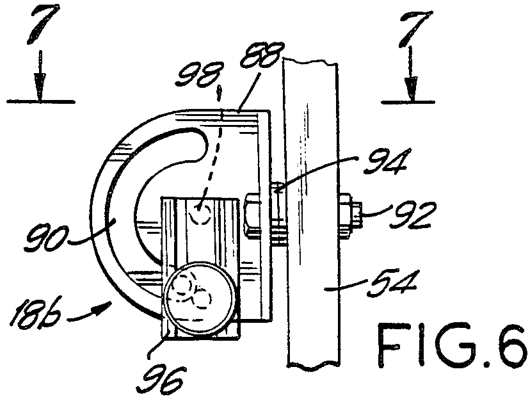
FIG. 6 is a side elvational view of a pivot clamp used to support and articulate the frame, beam and ballast of the invention.
Figure 7:
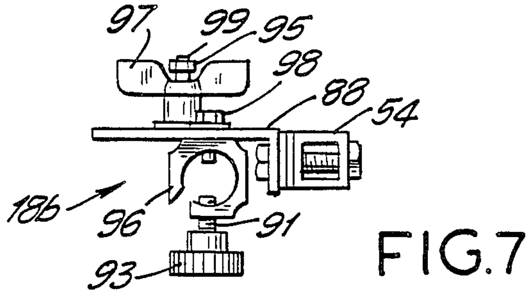
FIG. 7 is a top plan view taken in the direction of arrows 7—7 of FIG. 6.

FIGS. 6 and 7 show pivot clamp 18*b*. The details of the pivot clamp are identical to those for clamps 18 and 18*a*. Each pivot clamp includes an L-shaped bracket 88 having a short leg connected to its respective support component, in this case central rod or tube 54, and a long leg carrying an arcuate slot 90. In thecase of pivot clamp 18*b*, bracket 88 is pivotally connected by a pivot pin 92 to the central rod or tube 54 This permits rotation of the frame in a direction of arrow 20 shown in FIG. 1. It is noted that in the case of pivot clamps 18 and 18*a*, their U-shaped brackets are rigidly fixed to their respective elements, namely beam 16 and ballast 14.

Resistance to the pivotal rotation of clamp 18*b* with respect to rod 54 is provided by flat-washers 94. A nut and bolt combination forming the pivot pin 92 squeezes the flat washers 94 between bracket 88 and rod 54.

The bracket 88 also pivotally supports a C-shaped clamp member 96 which is a cast aluminum part, for example. Clamp member 96 is pivotally connected to bracket 88 on a pivot pin or hex bolt 98 which is at the center of curvature of the arcuate slot 90.

A threaded rod 99 has one end fixed to clamp member 96 and extends through slot 90. A knob 97 is threaded into rod 99 and can be rotated to press against the outer surface of bracket 88. This fixes the rotational position of clamp member 96 about pivot pin 98 and on bracket 88. A lock nut 95 is at a fixed position near the end of threaded rod 99 to keep knob 97 from being disengaged from the threaded knob.

A further knob 93 is fixed to a further threaded rod 91 which is threaded into an outer flange of clamp member 96. Knob 93 can be rotated to extend an inner end of rod 90 into the interior of the clamp member. When a post is inserted into this interior the rod 91 can be tightened against this post to hold the pivot clamp on that post.

Figure 9:
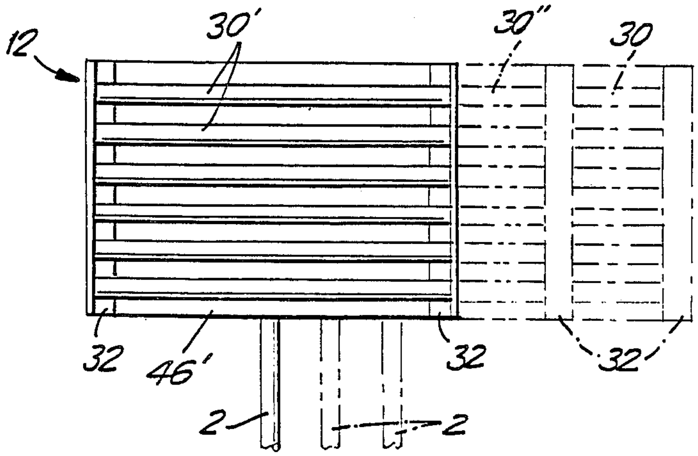
FIG. 9 is a front, schematic, elevational view of the fluorescent fixture showing three positions for accommodating three different lengths of the fluorescent tube.

FIG. 9 shows a frame 12 carrying six two foot fluorescent tubes 30'. The two supports 32 of frame 12 are kept apart by the physical presence of the tubes 30'. This outwardly directed force is counteracted by a narrow reflector 46' which, just as reflecter 46 for the four foot tubes, has fastening tapes at its ends. Tension knobs 58 also hold the supports 32 in position. This precludes the supports 32 from moving apart any further than is necessary to accommodate the two foot tubes 30'. The dot double-dash position for the right hand support 32 is for accommodating three foot tubes 30''. The phantom line position is for accommodating the standard four foot tubes 30. The position of the tripod 2 is also shown for each of the fluorescent tube lengths.

Figure 10:
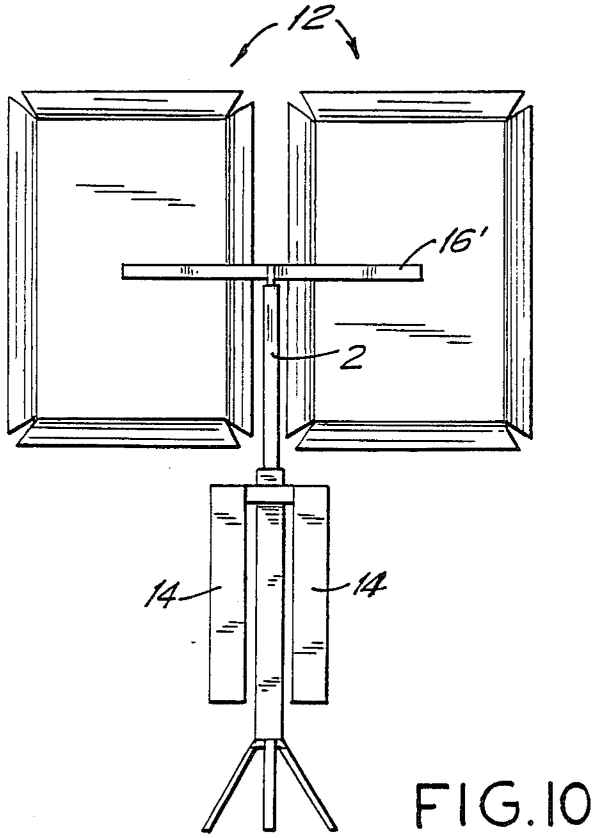
FIG. 10 is a rear elevational view showing a modification of the invention wherein two similar frames can be mounted on a single beam doubling the output of light, and creating a larger, 'softer', light source.

FIG. 10 shows an embodiment where two frames 12 can be connected together on a single beam 16' which has its clamp at the middle for engagement on tripod 2. Two ballasts 14 can be hung on the tripod 2 either by chains or by providing additional posts further down on the tripod.

While specific embodiments of the invention have been shown and described in detail to illustrate the application of the principles of the invention, it will be understood that the invention may be embodied otherwise without departing from such principles.

What is claimed is:

1. A collapsible fluorescent tube fixture comprising:

a frame having a pair of spaced apart tube ends supports each carrying a row of sockets, each socket being for receiving electrodes of one end of a fluorescent tube, and collapsing means operatively connected between said supports permitting said supports to be moved together into a storage position and apart into a used position, fluorescent tubes being connectable between sockets of said supports when said supports in their use position;

a boom having one end connected to said collapsing means for supporting said frame, and an opposite end;

an electrical ballast mechanically connected to said opposite end of said boom and electrically connected to said sockets for electrically ballasting fluorescent tubes connected to said socket; and a pivot clamp connected to said boom intermediate its ends for engagement on a support structure to carry the fixture, said collapsing means comprises a collapsible scissors assembly having a central rod and a pair of pivotally connected together scissors members operatively connected between said central rod and each support.

2. A fixture according to claim 1, wherein said electrical ballast physically counter-balances the weight of said frame.

3. A fixture according to claim 1, including a second pivot clamp connected between said one end of said boom and said central rod, and a third pivot clamp connected between said opposite end of said boom and said ballast for pivotally supporting said frame and said ballast on said boom.

4. A fixture according to claim 3, wherein each of said first mentioned, second and third pivot clamps comprise a clamp member having an opening for receiving a post, and a bracket pivotally mounted to said clamp member and connected to one of said boom, central rod and ballast.

5. A fixture according to claim 1, including a flexible reflector operatively connected between said supports.

6. A fixture according to claim 5, including a barn door pivotally connected to each support, said reflector having pair of edge flaps extending between said supports and positioned on opposite edges of said reflector, a bail pivotally mounted to both ends of each support, each bail being operatively connected to an end of one flap for supporting each flap.

7. A fixture according to claim 6, wherein each support includes a row of fluorescent end clips, each clip being aligned with one of said sockets for engaging an end of a fluorescent tube whose electrodes are engaged in said socket, said sockets being spaced apart in said storage position for said supports by a distance equal to a diameter of said reflector when said reflector is rolled up and positioned between said row of clips on said pair of supports.

8. A fixture according to claim 7, wherein said barn doors are positioned and have a width so that with said supports in their storage position, said barn doors can be folded over said rolled up reflector.

9. A fixture according to claim 1, including a flexible reflector operatively connected between said supports for reflecting light from fluorescent tubes connected between sockets of said supports, said supports being movable into a plurality of spaced apart use positions for accommodating fluorescent tubes of different lengths.

10. A collapsible fluorescent tube fixture comprising:

a frame having a pair of spaced apart tube ends supports each carrying a row of sockets, each socket being for receiving electrodes of one end of a fluorescent tube, and collapsing means operatively connected between said supports permitting said supports to be moved together into a storage position and apart into a used position, fluorescent tubes being connectable between sockets of said supports when said supports in their use position;

a boom having one end connected to said collapsing means for supporting said frame, and an opposite end;

an electrical ballast mechanically connected to said opposite end of said boom and electrically connected to said sockets for electrically ballasting fluorescent tubes connected to said socket; and a pivot clamp connected to said boom intermediate its ends for engagement on a support structure to carry the fixture, said collapsing means comprises a central rod in a plurality of scissor members operatively connected between said central rod and said supports, a second pivot clamp connected between said one end of said boom and said central rod at the center of said central rod, said first mentioned pivot clamp being connected to said boom at a location spaced from said second pivot clamp by slightly more than the distance between said second pivot clamp and an end of said central rod, said boom having a length substantially equal to the length of said ballast, and a third pivot clamp connected between said ballast and said opposite end of said boom.

11. A fixture according to claim 10, wherein said central rod is mounted for rotation to said second pivot clamp, about an axis normal to a plane passing through both of said supports.

12. A collapsible fluorescent tube fixture comprising:

a frame having a pair of spaced apart tube ends supports each carrying a row of sockets, each socket being for receiving electrodes of one end of a fluorescent tube, and collapsing means operatively connected between said supports permitting said supports to be moved together into a storage position and apart into a used position, fluorescent tubes being connectable between sockets of said supports when said supports in their use position;

a boom having one end connected to said collapsing means for supporting said frame, and an opposite end;

an electrical ballast mechanically connected to said opposite end of said boom and electrically connected to said sockets for electrically ballasting fluorescent tubes connected to said socket; and a pivot clamp connected to said boom intermediate its ends for engagement on a support structure to carry the fixture, each support comprises a bent sheet metal channel having a U-shaped portion with a long leg on which said sockets are mounted and a short leg, and a V-shaped portion connected to said short leg, a barn door pivotally connected to said long leg of said channel, a row of tube clips connected to said V-shaped portion and each aligned with one of said sockets for engaging an end of a tube whose electrodes are engaged in said socket, a connecting plug connected to said channel and electrical wires connected between said sockets and said electrical plug each disposed in said U-shaped portion.

13. A fixture according to claim 12 including a cover plate connected to said V-shaped portion and extending over said U-shaped portion.

14. A fixture according to claim 13 including a fastening tape extending along said V-shaped portion, said fixture including a reflector having a fastening tape at each end, each fastening tape of said reflector being engaged with a fastening tape of one of said V-shaped portions for stretching said reflector between said supports.

15. A fixture according to claim 14, wherein said reflector has edge flaps each extending between said supports with said supports in said use position, a bail pivotally connected to each end of each channel, each flap having ends engaged with bails of said channel.

16. A collapsible fluorescent tube fixture comprising a pair of spaced apart tube end supports each carrying a row of sockets, each socket being for receiving electrodes of one end of a fluorescent tube, a collapsible scissor assembly operatively connected between said supports for permitting movement together and movement apart of said supports with said supports being held parallel in a closed together storage position and in a separated use position, a flexible reflector connected between said supports and an electrical ballast mechanically connected to said scissor assembly and electrically connected to said sockets.

17. A fixture according to claim 16, wherein said scissor assembly comprises a central rod and a pair of scissor members pivotally mounted to each other and pivotally mounted between said central rod and each of said supports.

18. A fixture according to claim 17, including a boom having one end pivotally connected to said central rod and an opposite end pivotally connected to said ballast.

19. A fixture according to claim 16, including additional reflectors each with a different length for holding said supports from moving apart beyond a selected distance, said selected distance being substantially equal to a length of different fluorescent tubes to be engaged between sockets of said pair of supports.

20. A fixture according to claim 16, including a second pair of spaced apart tube end supports and a second collapsible scissor assembly connected between said second pair of supports for permitting movement together and apart of said second pair of supports between a storage position and a use position, and a boom having opposite ends connected respectively to said first mentioned and additional collapsible scissor assemblies.

* * * * *